United States Patent [19]

Webster

[11] 4,420,925
[45] Dec. 20, 1983

[54] MULTI-BLADE LAWNMOWER ATTACHMENT

[75] Inventor: Kenneth Webster, Odin, Ill.

[73] Assignee: Branson, Jones & Branson, Centralia, Ill.

[21] Appl. No.: 238,352

[22] Filed: Feb. 25, 1981

[51] Int. Cl.³ .................................................. A01D 35/12
[52] U.S. Cl. ........................................ 56/15.9; 56/15.5
[58] Field of Search ................. 56/6, 15.5, 16.7, 15.9, 56/17.1, 17.2, 16.2, 16.3, 14.9

[56] References Cited

U.S. PATENT DOCUMENTS

| | | | |
|---|---|---|---|
| 3,334,476 | 8/1967 | Engler | 56/15.9 |
| 3,514,126 | 5/1970 | Fuss | 56/6 |
| 3,921,373 | 11/1975 | Rubin | 56/16.7 |
| 3,946,681 | 3/1976 | Sylvester | 56/16.7 |
| 4,120,136 | 10/1978 | Rose | 56/17.1 |
| 4,307,561 | 12/1981 | Hicks | 56/15.9 |

Primary Examiner—Robert A. Hafer
Attorney, Agent, or Firm—Harvey B. Jacobson

[57] ABSTRACT

A lawnmower attachment for providing an increased cutting width on a lawnmower uses a mower deck attachable by means of a hitch to the back of a riding lawnmower, or other pulling unit, and includes the use of at least two additional lawnmower cutting blades operably powered by an independent motor mounted on the mower deck. A pair of guide wheels mounted in a spaced apart relationship are provided to support the mower deck off the ground, while a non-horizontally pivotable hitch arrangement is provided to prevent jackknifing of the attachment during a reverse movement of the riding lawnmower.

3 Claims, 11 Drawing Figures

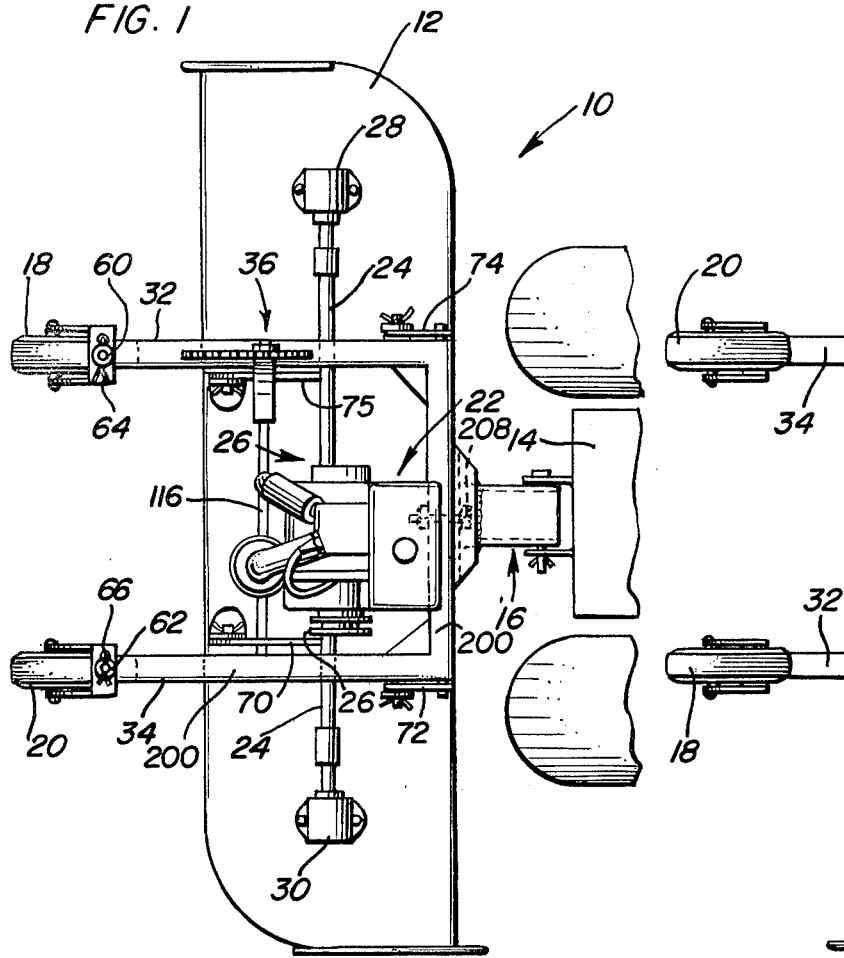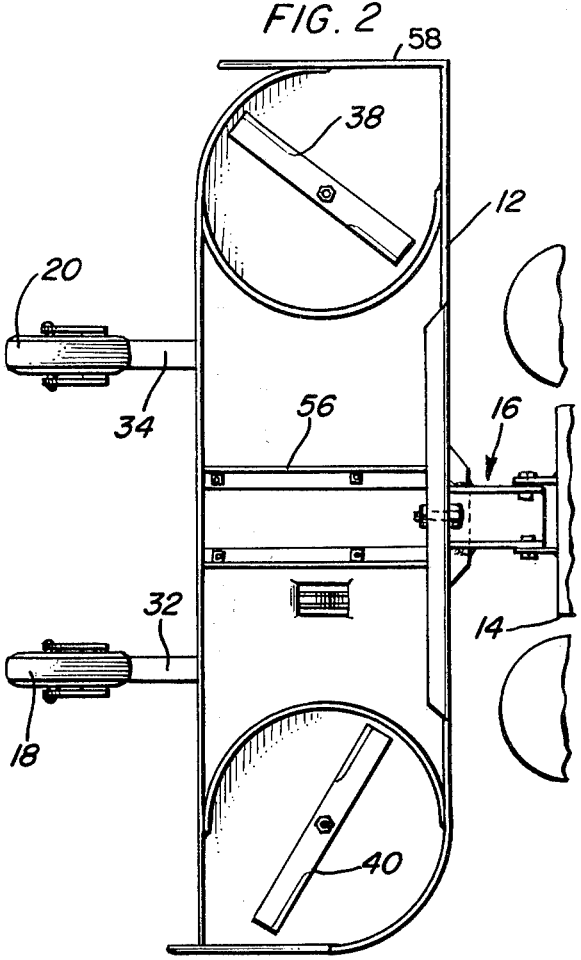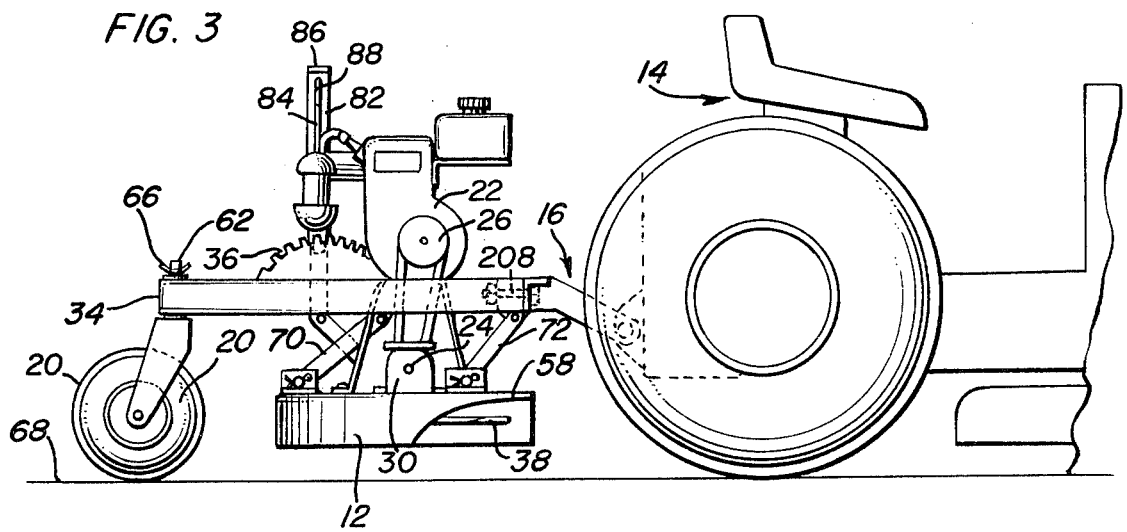

U.S. Patent   Dec. 20, 1983   Sheet 3 of 3   4,420,925
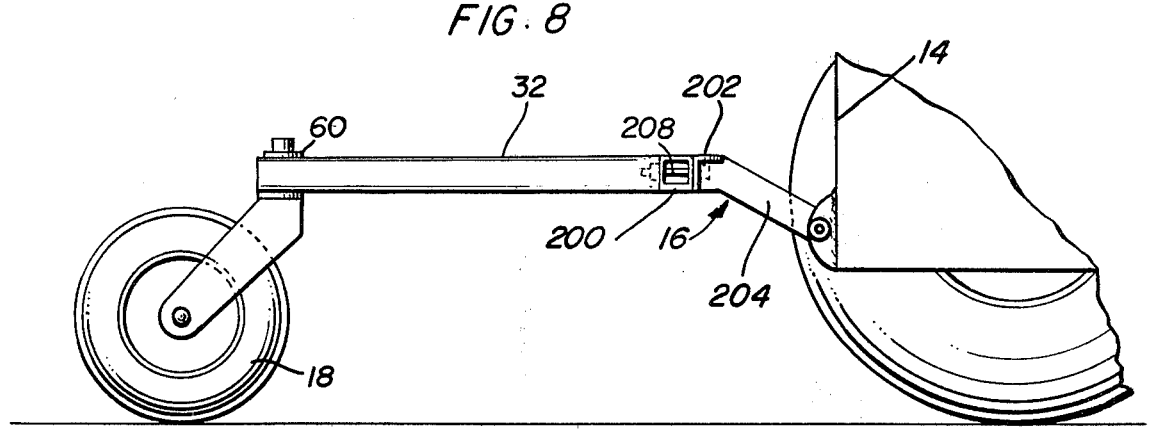
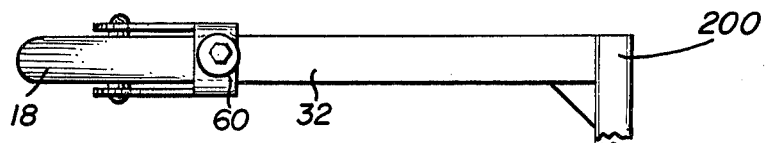
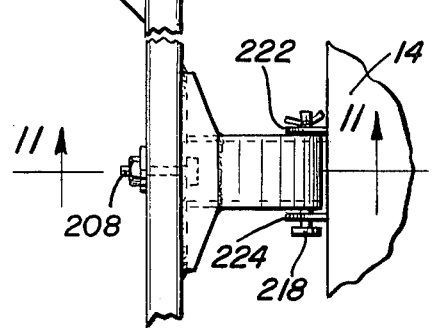
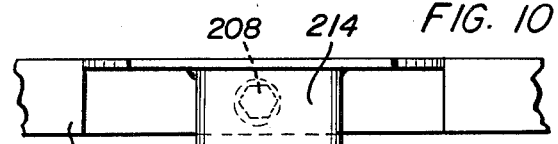
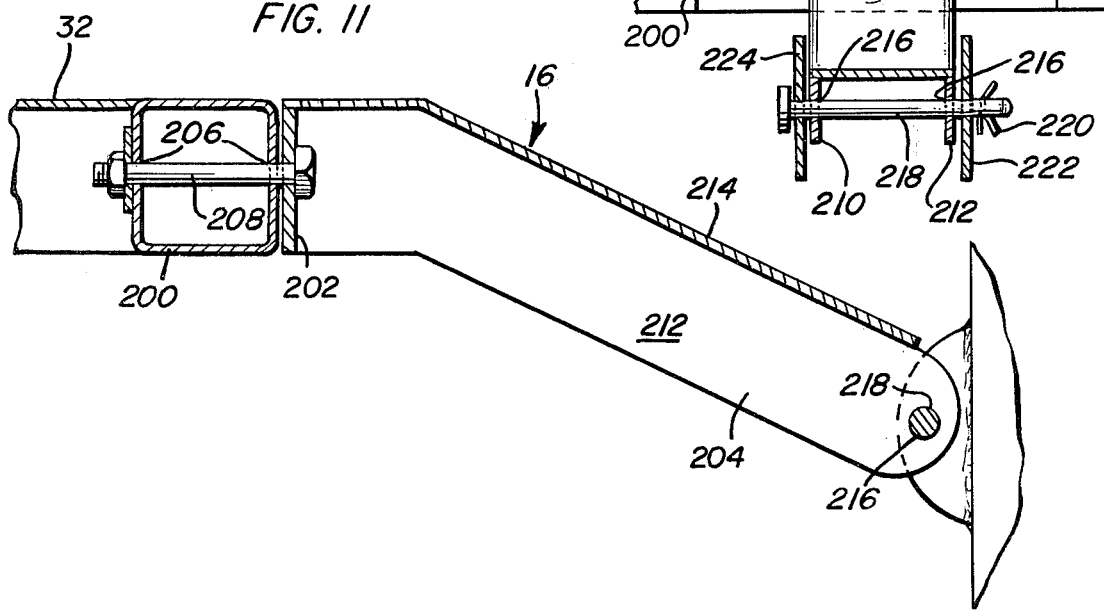

MULTI-BLADE LAWNMOWER ATTACHMENT

BACKGROUND OF THE INVENTION

1. Field of the Invention

The present invention relates generally to lawnmowers and more particularly pertains to a lawnmower attachment which includes a pair of additional cutting blades driven by an independent power source mounted on the attachment and to facilitate reverse cutting operation without the fear of jackknifing during reverse motion of the lawnmower.

2. Description of the Prior Art

It is generally well known to utilize additional rotary cutting blades in operable connection with a single cutting blade associated with a lawnmower. For example, U.S. Pat. No. 3,483,684, issued to Price on Dec. 16, 1969, discloses a mounting linkage utilizable in combination with a tractor-type lawnmower, such linkage consisting of an attachment designed to replace an existing cutting blade with an assembly of three rotary cutting blades. This construction substantially increases the width of cut afforded by the tractor during an operation thereof, and it can be appreciated that the power supplied to the three blades comes from the same fuel-powered engine that drives the tractor. While this particular construction is effective in substantially increasing the width of a particular cut, it is apparent that it becomes a difficult operation to switch from the three cutting blade unit to a single cutting blade unit, and vice versa. In other words, no provision is made for easily and quickly dropping off two of the cutting blades while retaining the third in powered connection with the engine of the tractor. Additionally, the powering of three blades by the same engine which formerly only powered one such blade results in a substantial loss of driving and cutting power in the entire assembly.

As opposed to the approach of replacing the existing cutting blade on a tractor lawnmower, there have been several attempts to develop lawnmower attachments which are connectible to a tractor normally not having a cutting blade, through the use of a hitch mechanism. For example, U.S. Pat. No. 3,264,807, issued to Wallace on Aug. 9, 1966; U.S. Pat. No. 3,514,126, issued to Fuss on May 26, 1970; and U.S. Pat. No. 4,063,748, issued to Schmidt on Dec. 20, 1977, all disclose wheeled attachments which may be connected to a tractor or other pulling unit through the use of a hitch assembly, such pulling unit not having an individually powered cutting blade of its own. Further, in each of these patents, independent power supply means for rotating the cutting blades associated with the attachments are provided, so that no power is taken away from the pulling tractor during an operation of the mowers. While each of the inventions disclosed in these patents allows more versatility and ease of use than the afore-described Price lawnmower, none of these inventions are designed to facilitate a reverse cutting operation. In this regard, the hitch assemblies associated with each of the respective inventions permit a pivotal movement of the mower attachments relative to the tractors, so that any attempt in backing up such a tractor results in a jackknifing of the mower assembly attached thereto. Further, the particular means by which the respective cutting blades in the above-identified inventions are adjusted to a desired cutting depth are of a complex construction, usually involving multi-adjustments of the associated guide wheels to regulate such cutting depth.

In this connection, there has been at least one attempt to develop an efficient cutting blade depth adjustment means whereby minimal effort is required to adjust the blade cutting height. Specifically, U.S. Pat. No. 3,699,752, issued to Dandl on Oct. 24, 1972, discloses a modular constructed rotary mower which utilizes a drive shaft and gear box assembly to operate three mower cutting blades, while a hitch means is provided for connecting the same to a pulling unit such as a tractor. Through a simple rotation of the shaft to which the guide wheels are attached, the cutting blade height may be easily adjusted; however, this construction still suffers from the disadvantage of utilizing the tractor engine as the powering means for the three blades, while the provided hitch assembly permits the entire assembly to jackknife during a backing up of the pulling unit.

Accordingly, it can be appreciated that there still exists a need for a multi-blade mower attachment assembly which may be independently powered so as to not drain power from a pulling unit, which provides for easy blade cutting height adjustment, and which may be utilized without the fear of jackknifing during a backing up of the pulling unit. In this connection, the present invention substantially fulfills this need.

SUMMARY OF THE INVENTION

The general purpose of the present invention, which will be subsequently described in greater detail, is to provide a multi-blade lawnmower attachment assembly which has all of the advantages of the prior art mower attachment assemblies and none of the disadvantages. To attain this, the present invention utilizes a mower deck to which is rotatably attached a pair of mower cutting blades, while an independent fuel fired engine is mounted on the mower deck for operably driving the two blades associated therewith. Further, the present invention utilizes a hitch assembly that is non-horizontally pivotably attachable to a tractor lawnmower having its own independent power source and rotary cutting blade. Additionally, a blade height adjustment means is provided which employs the use of a lever operated lowering and raising mechanism fixedly secured to a frame on which the mower deck support wheels are rotatably attached.

It is another object of the present invention to provide a multi-blade lawnmower attachment assembly which may be easily and economically manufactured.

It is a further object of the present invention to provide a multi-blade lawnmower attachment assembly that may be easily, reliably and efficiently operated.

Still another object of the present invention is to provide a multi-blade lawnmower attachment assembly that has its own independent power source.

Yet another object of the present invention is to provide a multi-blade lawnmower attachment assembly which permits an operator to selectively increase the number of lawnmower cutting blades used during a grass cutting operation.

Even another object of the present invention is to provide a multi-blade lawnmower attachment assembly which employs the use of a non-horizontally pivotable hitch apparatus or the use of a pivot providing vertical swinging about a horizontal axis and operable to permit a backing up of a pulling unit without a fear of the assembly jackknifing relative thereto.

A still further object of the present invention is to provide a multi-blade lawnmower attachment assembly that utilizes a unique lever operated blade cutting height adjustment means.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the multi-blade lawnmower attachment assembly forming the present invention and showing the same operably attached to a pulling tractor.

FIG. 2 is a bottom plan view of the assembly illustrated in FIG. 1.

FIG. 3 is a side view of the multi-blade lawnmower attachment assembly forming the present invention and again shown operably attached to a pulling tractor.

FIG. 8 is a partial side view of the deck portion and associated hitch assembly of the present invention.

FIG. 9 is a top plan view of a portion of the present invention illustrating further structural details of the hitch assembly.

FIG. 10 is a partial end plan view, partly in section, illustrating further details of the hitch assembly.

FIG. 11 is a sectional side view of the hitch assembly taken along the line 11—11 of FIG. 9.

DESCRIPTION OF THE PREFERRED EMBODIMENT

Figure 4:
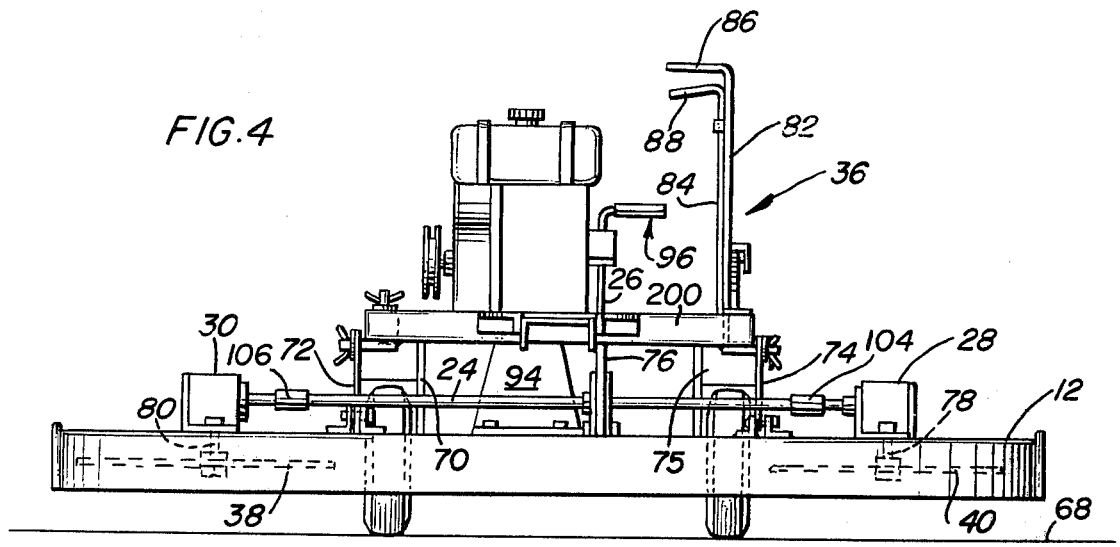
FIG. 4 is a front elevational view of the present invention.

With reference now to the drawings and in particular to FIG. 1 thereof, a multi-blade lawnmower attachment assembly embodying the principles and concepts of the present invention and generally designated by the reference numeral 10 will be described in detail. In this respect, it can be seen that the multi-blade lawnmower attachment 10 includes a mower deck 12 fixedly secured to a tractor or pulling unit 14 through the use of a hitch means 16 and having a pair of supporting and guiding wheels 18, 20 operably attached thereto. Further, the assembly 10 includes a fuel-powered motor 22 which may be operated to rotate a drive shaft 24. The drive shaft 24 receives its rotative power from a pulley and belt assembly 26 operated by the motor 22, and the drive shaft extends outwardly to two gear housings 28, 30, one each of said gear housing being positioned at opposed ends of the drive shaft.

Additionally illustrated in FIG. 1 is the fact that the guiding and supporting wheels 18, 20 are each respectively rotatably mounted to wheel support members 32, 34, while a cutting blade height adjustment mechanism 36 is shown fixedly secured to and operably a part of the wheel support member 32.

With reference to FIG. 2 of the drawings, it can be seen that a first rotatable cutting blade 38 is positioned on a bottom remote end of the mower deck 12, while a second rotatable cutting blade 40 is positioned on the opposed bottom remote end of the deck. Also shown in FIG. 2 is a center support plate 56 mountable by conventional means, such as bolts and nuts or the like, to a bottommost portion of the mower deck 12, such support plate facilitating the attachment of further plate members associated with the mower deck 12 thereto, while at the same time providing structural strength and support to the entire assembly 10.

Referring to FIG. 3 of the drawings, it can be seen that the mower deck 12 may be provided with a chute or opening 58 at one end thereof proximate to the cutting blade 38, while a similar chute may be provided at the opposed end of the mower deck 12 so as to provide means for grass to be ejected away from both of the cutting blades 38, 40. Further illustrated in FIG. 3 is the fact that the respective guiding and support wheels 18, 20 are mounted to their wheel support members 32, 34 in a horizontal pivotal relationship. Specifically, each wheel 18, 20 is provided with an upstanding tubular bearing member 60, 62, respectively, such bearing members being positionable through apertures contained within the wheel support members and being rotatably secured thereto through the use of respective cotter pins 64, 66, or similar attachment means.

By the same token, it can be seen that the mower deck 12, having the cutting blades 38, 40 operably associated therewith, is adjustable in height from a ground surface 68 through the use of a plurality of pivotable link members, only two 70, 72 of which are illustrated in FIG. 3. In this connection, it can be seen that the pivotal link members 70, 72 are rotatably attached at their respective ends through the use of bolt and cotter pin arrangements whereby they may be selectively raised toward a substantially horizontal relationship with the wheel support members 32, 34, or in the alternative, they may be lowered toward a position whereby they would be perpendicularly aligned with the wheel support members. While two of the pivotal link members 70, 72 are shown pivotally and operatively connected to the wheel support member 34 in FIG. 3, it is to be understood that the additional identical pivotal link members 75, 74 are similarly attached to the wheel support member 32, whereby the entire mower deck 12 is supported by these four pivotal link members.

FIG. 4 more clearly illustrates the supporting of the mower deck 12 by the pivotal link members 70, 72, since additional pivotal link members 74 and 75 can be seen with reference to this drawing. Additionally, the drive belt 76 which forms a part of the pulley and belt assembly 26 can be viewed in its driving relationship. Also viewable in this Figure is the respective gear housings 28, 30 which have conventional gear arrangements positioned therein which permit a transfer of rotative power from the drive shaft 24 to drive shafts 78, 80 which are respectively rotatably and fixedly secured to the cutting blades 40 and 38. In this regard, two conventional 45° angle bevel gears (not shown) may be positioned in each of the gear housings 28, 30 whereby one of such bevel gears would be rotatably secured to the drive shaft 24 while the second of such gears would be rotatively fixedly attached to the respective drive shafts 78, 80 to thus provide the gear assembly means for driving the cutting blades 40, 38. Also illustrated in FIG. 4 is the fact that the cutting blade height adjustment mechanism 36 may include a first fixed vertically positioned lever 82, such lever having a second vertically positioned lever 84 in an abutting and sliding relationship thereto. In this connection, the first lever 82 is provided with a bent-over handle portion 86 while the second lever 84 is provided with a bent-over handle portion 88, whereby an operator might concurrently grip the two handle portions and squeeze the same toward one another to cause a reciprocable and sliding movement of the lever 84 upwardly along the lever 82. As will be subsequently described, this upward movement of the second lever 84 results in a temporary release of the cutting blade height adjustment mechanism 36 so as to facilitate a change in cutting blade height as desired by an operator.

Figure 5:
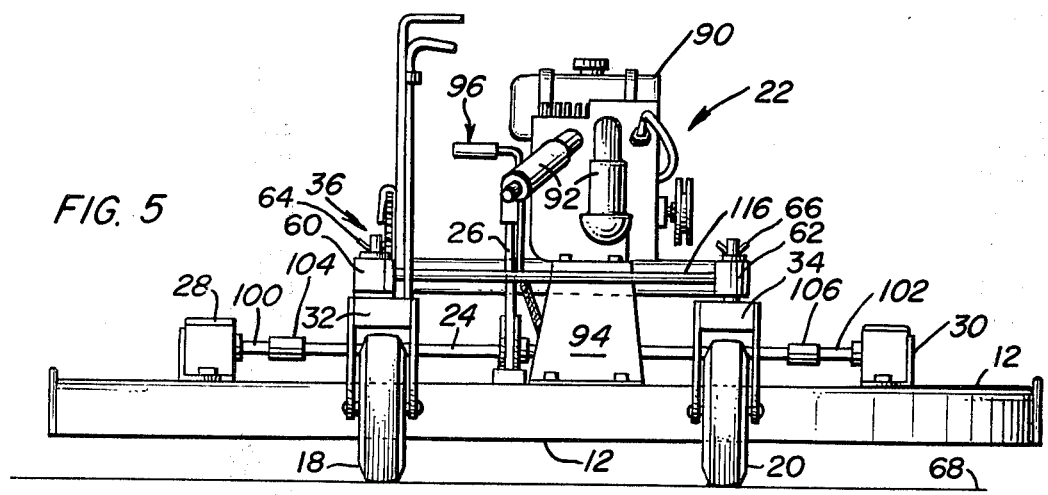
FIG. 5 is a rear elevational view of the present invention.

With reference to FIG. 5 of the drawings, it can be seen that the motor 22 might typically be a gasoline or similarly powered engine having a fuel supply tank 90 on a topmost portion thereof, while a muffler and exhaust system 92 may be directed rearwardly from the assembly 10 so as to prevent injury to a user thereof. Further, it can be seen that the motor 22 is directly attachable to the mower deck 12 by a support base member 94, such base member being directly attachable to the mower deck and to the motor by any conventional means, such as nuts and bolts as illustrated. Further illustrated in this Figure, as in FIG. 4, is the positioning of a power release means 96 which will be further described with reference to FIG. 7 of the drawings. Also illustrated in both FIGS. 4 and 5, is the fact that the drive shaft 24 may be operatively attached to the rotatable shafts 100, 102 respectively extending out of the gear housings 28, 30 through the use of couplings 104, 106. As such, a bent drive shaft 24 may be easily replaced through a removal of the respective couplings 104, 106 without having to disassemble the gear housings 28, 30, as well as the gears associated therewith.

Figure 6:
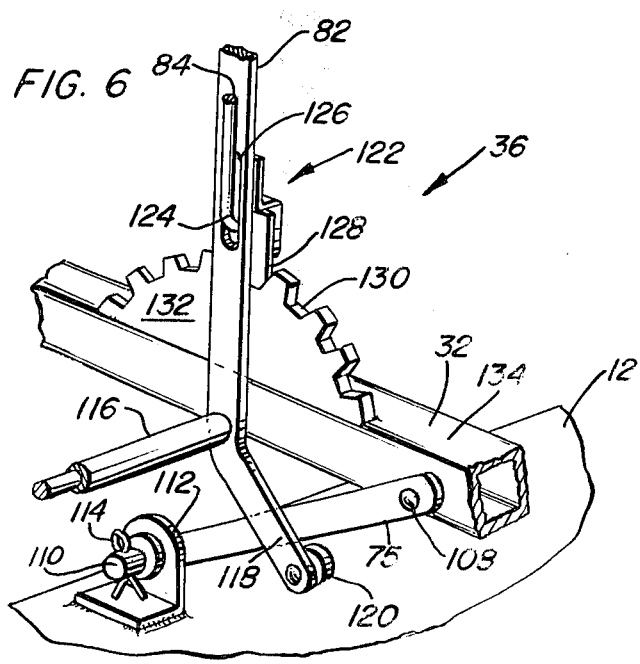
FIG. 6 is a perspective detail view illustrating the operation of the blade-adjustment means associated with the present invention.

Referring now to FIG. 6 of the drawings, a description of the cutting blade height adjustment mechanism 36 will be provided. Specifically, it can be seen that the wheel support member 32 is rotatably attached to the mower deck 12 by a front pivotal link member 74 as shown in FIG. 4, and a back or rearwardly positioned pivotal link member 75, as aforedescribed. In this respect, the link member 75 is pivotable about a projection 108 extending outwardly from the wheel support member 32 and is similarly rotatable about a bearing member 110 rotatably positionable through a bracket 112 attached to the mower deck 12, such bearing member 110 being fixedly secured to the pivotal link member 75 and being rotatably secured to the bracket 112 through the use of a cotter pin 114. As such, it can be appreciated that the mower deck 12, as was discussed above, is selectively adjustable in height upwardly and downwardly relative to the wheel support member 32 by a movement of the pivotal link member 75, along with the other three link members 70, 72, 74 which are similarly attached between the wheel support members 32, 34 and the mower deck 12.

Further, it can be seen that the aforementioned lever 82 is fixedly and orthogonally secured to a support shaft 116, such support shaft 116 being rotatably supported and mounted in the frame assembly of the present invention. As is then apparent, the lever 82 is rotatable with the support shaft 116 through a plane defined by the horizontal length of the lever and being perpendicular to the longitudinal axis of the support shaft 116. Further illustrated in FIG. 6 is the fact that a bottommost portion 118 of the lever 82 is angulated therefrom and includes a roller cam member 120 which may selectively abut against the link member 75. In this regard, it can be seen that the roller cam member 120 serves as a support against which the link member 75 rests, and in response to a variance in position thereof as caused by a rotation of the lever 82 about the horizontal axis of the shaft 116, the mower deck 12 will vary in elevation from the wheel support member 32. To prevent the lever 82 from arbitrarily rotating about the horizontal axis of the shaft 116, a lock mechanism 122 is provided, such lock mechanism including the reciprocable lever 84 which is slidably positioned against the lever 82 and which has a bent portion 124 extending through a slot 126 contained in the lever 82. On the free end of the bent portion 124 extending through the slot 126, a lock member 128 is fixedly attached and is designed for engagement with one of a plurality of detents 130 contained in a substantially semi-circular plate member 132. The semi-circular plate member 132 is fixedly attached to a topmost surface 134 of the wheel support member 32 by conventional attachment means, such as welding or the like. As such, it can be appreciated that when an operator squeezes the two handle portions 86, 88 towards one another, as shown in FIG. 4, the second lever 84 will slide upwardly toward the handle portion 86 so as to cause the bent portion 124 thereof to move upwardly within the slot 126 contained in the lever 82. This movement, of course, results in the lock plate or member 128 moving out of engagement with a particular detent 130 whereby the lever 82 may now be selectively rotated about the horizontal axis of the shaft 116. This rotation then changes the position of the cam follower 120 to thus vary the height of the mower deck 12 relative to both the wheel support member 32 and to the other wheel support member 34, and when the desired cutting blade height is achieved, the lock member 128 may be moved into another detent 130 to effectively prevent any further rotation of the lever 82. In this respect, it is envisioned that the lever 84 would be spring biased downwardly toward the respective detents 130, thereby assuring that the lock member 128 would engage with a particular detent 130 upon a release of upward pressure on the handle portion 88 by an operator.

Figure 7:
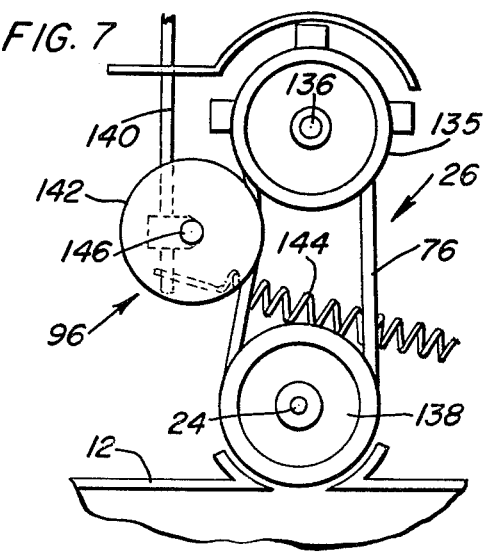
FIG. 7 is a detail structural view illustrating the use of a drive belt tensioning means in combination with the present invention.

FIG. 7 illustrates a further unique feature of the present invention which essentially consists of the aforementioned power release means 96. Specifically, it can be seen that the aforedescribed pulley and belt assembly 26 includes the drive belt 76 operably positioned around a pulley 135 fixedly secured to a drive shaft 136 of the motor 22. Similarly, the drive belt 76 is positionable around a second pulley 138 which is fixedly secured to the drive shaft 24, whereby the rotational movement of the shaft 136 is translated by the belt 76 to the drive shaft 24. Through the use of the power release means 96, the drive belt 76 may be loosely positioned over the pulleys 135, 138 so that no driving force is imparted to the drive shaft 24 unless the drive belt is first tensioned to effect such a driving force. This tensioning is provided by a lever 140 and a pulley 142 engageable with the drive belt 76 in the manner illustrated so as to impart a driving tension to the belt. The belt tensioning pulley 142 is normally held in a tensioning engagement with the drive belt 76 by a tension spring 144 operably attached to an end of the lever 140 and to some point on the mower deck 12. Accordingly, it can be appreciated that rotation of the shaft 136 will then normally impart a driving rotational force to the drive shaft 24, and thence to the cutting blades 38, 40. However, should an operator desire to stop the rotation of the cutting blades 38, 40, he need only to pull the lever 140 in a manner to move the pulley 142 and its shaft 146, such movement resulting in a stretching or tensioning of the tension spring 144 and further serving to pull the pulley 142 out of tensioning engagement with the drive belt 76. Accordingly, the drive belt 76 will simply slide over the pulley 138 without imparting a rotational drive force to the drive shaft 24, since too much slack will exist in the drive belt to cause a frictional engagement therebetween.

Referring now to FIGS. 8-11 of the drawings, a more complete description of the hitch assembly 16 will be provided. In this respect, it can be seen that the wheel supports 32 and 34 are rigidly connected by a transversely-extending support member 200 fixedly and permanently secured to the forward ends thereof. The hitch assembly 16 is formed from a first support portion 202, which typically would be constructed of angle iron, and a downwardly extending tongue portion 204 which serves to facilitate attachment of the hitch assembly 16 to the pulling unit 14. As shown, the transversely-extending support member 200 may be provided with a centrally positioned through-extending aperture 206, such aperture serving to receive a generally horizontally disposed nut and bolt assembly 208 which operatively attaches the hitch assembly 16 to the member 200. As can be appreciated then, the nut and bolt assembly 208 serves as a bearing means whereby the mower 10 may rotate about the longitudinal axis of the bolt assembly 208 thus permitting the mower 10 to move easily over the irregular contour of the ground without any disruptive torque being applied to the hitch assembly 16. The downwardly extending tongue portion 204 of the hitch assembly 16 includes two side plates 210, 212 and a topmost covering plate 214. A through-extending aperture 216 is provided through the side plates 210, 212 whereby a generally horizontally disposed bolt 218 may be positioned through the aperture 216 and retained in place through the use of a cotter pin 220. In this respect, it may be seen in FIG. 9 that the pulling unit 14 may be provided with a pair of outwardly extending hitch attachment members 222, 224, such members being provided with apertures whereby the bolt 218 may extend concurrently through the apertures to effect an attachment of the mower deck 12 to the pulling unit. As such, the bolt 218 permits up and down movement of the mower deck 12 about the longitudinal axis of the bolt 218 and relative to the pulling unit 14. As such, the mower deck 12 is rovided with a further means of moving over the irregular contour of the earth without any disruptive forces being applied to the hitch assembly 16 and to the tractor 14. At the same time and with reference again to FIG. 9 of the drawings, it can be seen that the particular construction of the hitch assembly 16 prevents any rotation of the mower deck 12 about an axis extending perpendicularly from the earth, thereby to prevent any danger of the mower deck jackknifing during a reverse or backward movement of the tractor 14.

In operation then, it can be appreciated that a user of a tractor lawnmower 14 need only to attach the multi-blade lawnmower attachment assembly 10 of the present invention to his tractor lawnmower through the use of the hitch means 16 as aforedescribed. He may then start the motor 22 which imparts a rotational force to the drive shaft 136, such rotational force being deliverable to the drive shaft 24 through the use of the aforementioned drive belt 76. This rotation of the drive shaft 24 is translated through the respective gear housings 28, 30 to the cutting blades 40, 38 so that the operator now has three lawnmower cutting blades in operation, as opposed to only one which is normally associated with the tractor lawnmower. In view of the fact that an independent power means, i.e., the motor 22, is provided to operate the cutting blades 38, 40, no power is taken away from the tractor lawnmower which could result in some difficulty during a cutting operation.

In the event that an operator wishes to adjust the cutting height of the lawnmower blades 38, 40, he need only to squeeze the handle portions 86, 88 of the respective levers 82, 84 together, so as to release the lock mechanism 122, and he may then rotate the lever 82 and the shaft 116 so as to vary the height of the mower deck 12 relative to the wheel support members 32, 34. Upon a release of the handle portions 86, 88, a lock member 128 will move into one of a plurality of detents 130 contained in a plate member 132 so as to effectively lock the mower deck 12 in position at a desired blade cutting height.

Further, should the operator desire to stop the rotation of the respective cutting blades 38, 40 without shutting off the motor 22, he need only to move the lever 140 to bring the pulley 142 out of engagement with the drive belt 76. As such, the drive belt 76 will no longer frictionally engage the pulley 138 so as to impart a rotational driving force to the drive shaft 24, and accordingly, the rotation of the cutting blades 38, 40 will cease. If desired, the lever 140 may be provided with a lock means to retain the same in a position whereby the pulley 142 is not in engagement with the drive belt 76.

With respect to the above description, it should be realized that the optimum dimensional relationships for the parts of the invention are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A lawnmower assembly comprising in combination:
   a pulling unit having a first lawnmower blade assembly operably associated therewith, said first lawnmower blade assembly serving to cut a first swath of a predetermined width through grass and the like;
   a towed unit having a second lawnmower blade assembly operably associated therewith, said second lawnmower blade assembly being positionable relative to said pulling unit in a manner whereby at least one second swath of a predetermined width is cut through said grass and the like concurrently with cutting of said first swath; and
   hitch means connecting said towed unit to said pulling unit, wheel means providing support for the towed unit, said hitch means including a first pivot bolt means extending parallel to the longitudinal horizontal direction of movement of the lawnmower assembly and enabling relative pivotal movement between the towed unit and pulling unit only about a longitudinal axis parallel to the longitudinal direction of the towed and pulling units, and a second pivot bolt means extending perpendicular to the first pivot bolt means and transverse to the longitudinal horizontal direction of movement of the lawnmower assembly and enabling relative pivotal movement between the towed unit and pulling unit only about a transverse axis perpendicular to the longitudinal direction of movement of the towed and pulling units thereby enabling the towed unit to follow the contour of the supporting surface engaged by the wheel means by permitting relative pivotal movement between the units about a longitudinal horizontal axis and a transverse horizontal axis and preventing relative movement of the units about a vertical axis to prevent jackknifing of said towed unit with respect to said pulling unit when said lawnmower assembly moves in a reverse direction.

2. The combination as defined in claim 1 wherein said second lawnmower blade assembly includes a mower deck having a pair of cutting blades rotatably supported therefrom and disposed to cut two swaths contiguous to and on opposite sides of said first swath, said wheel means being attached to said mower deck, means to adjust the cutting height of said pair of cutting blades, and a single prime mover mounted on said towed unit for driving said pair of cutting blades independent of the pulling unit.

3. The combination as defined in claim 2 wherein said wheel means are connected to the towed unit at the rear edge thereof and the hitch means is connected to the towed unit at the forward edge thereof with the cutting blades being disposed between the forward and rear edges of the towed unit, said wheel means including a pair of wheels spaced transversely with respect to each other and swivelly supported from the towed unit for pivotal movement about substantially vertical axes to enable the towed unit and pulling unit to remain in longitudinal alignment when maneuvering the lawnmower assembly when cutting grass and the like.

* * * * *